Aug. 2, 1966 — J. P. KROUSE ETAL — 3,263,785

TORQUE RELEASING CLUTCH MECHANISM AND MOTOR CONTROL

Filed July 31, 1964 — 2 Sheets-Sheet 1

INVENTORS
JOHN P. KROUSE
RICHARD C. FRISBIE
BY
David W. Tibbott
ATTORNEY

INVENTORS
JOHN P. KROUSE
RICHARD C. FRISBIE
ATTORNEY

United States Patent Office 3,263,785
Patented August 2, 1966

3,263,785
TORQUE RELEASING CLUTCH MECHANISM
AND MOTOR CONTROL
John P. Krouse, Athens, and Richard C. Frisbie, Sayre, Pa., assignors to Ingersoll-Rand Company, New York, N.Y., a corporation of New Jersey
Filed July 31, 1964, Ser. No. 386,592
3 Claims. (Cl. 192—150)

This invention relates to a torque release clutch mechanism which opens a drive connection between a driving member and a driven member when the torque load on said members exceeds a predetermined value or magnitude. The torque release clutch mechanism of this invention is particularly useful in tools which apply torque loads to fasteners, such as power-operated wrenches or screwdrivers.

In driving a screw or other threaded fastener "home," into a holding position, it is highly desirable to use a power-operated tool containing a torque release clutch which automatically releases the torque driving force on the fastener after it is tightened to a selected or predetermined torque load. In order to prevent the tool from "kicking" the operator, the clutch must release the torque load at a relatively high speed; otherwise if the clutch releases relatively slowly, the operator receives an undesirable torque reaction while the clutch is releasing. During the period that the clutch is engaged, the drive from the tool motor to the fastener must be as rigid (non-yielding) as possible for efficient transmission of the torque. On the other hand, once the clutch releases, the release of torque must be complete to prevent the application of an undesirable torque reaction on the operator.

The principal object of this invention is to provide a torque release clutch mechanism having a relatively simplified structure of a novel type and which substantially eliminates or minimizes the foregoing problems.

Other important objects of this invention are: to provide a torque release clutch mechanism which releases itself under a selected or predetermined torque load with the torque release taking place at a relatively high speed and being a substantially complete torque release; to provide a relatively simple and economical torque responsive clutch mechanism which can be adjusted to release under a variety of different torque loads; to provide a torque responsive clutch mechanism which substantially rigidly transmits a torque load before releasing and which releases the transmission of torque substantially completely after it is released; and to provide a torque responsive clutch mechanism adapted to cooperate with a motor shut-off means for automatically deenergizing a motor in response to the release of the clutch mechanism.

The invention is described in connection with the accompanying drawings wherein.

Figure 1:
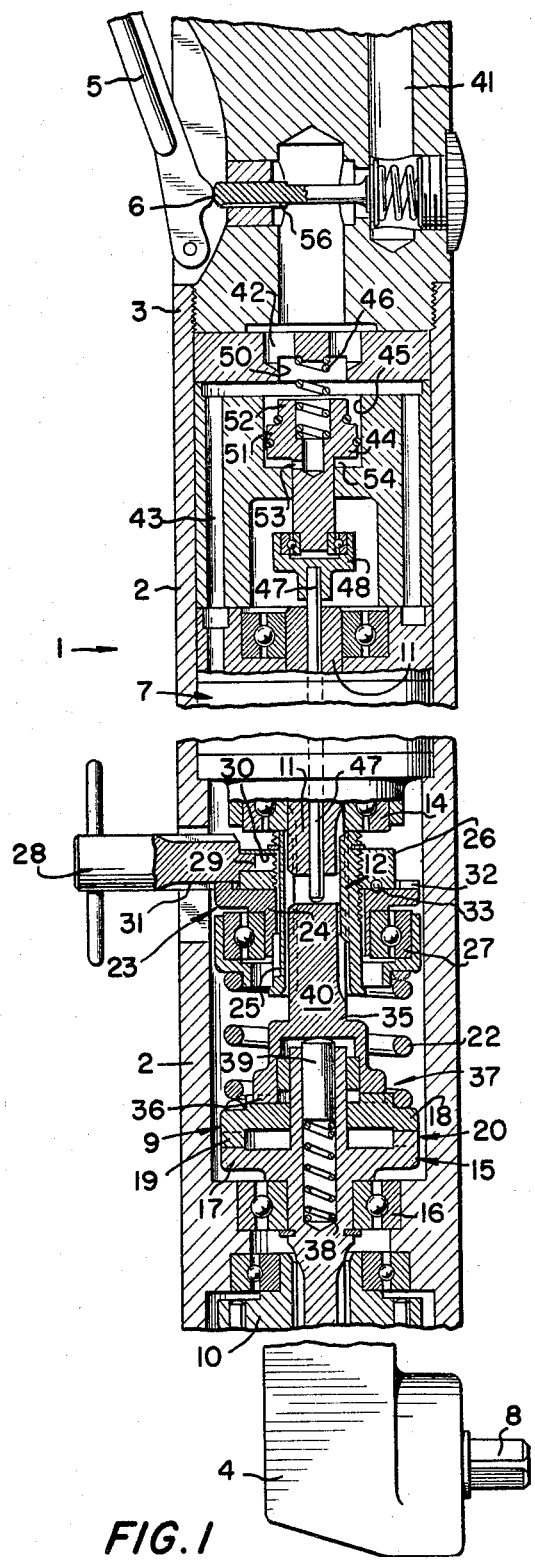
FIG. 1 is a longitudinal section of an angle wrench containing an embodiment of the disclosed invention, with portions of the wrench being broken and the clutch being shown in an engaged position.
Figure 3:
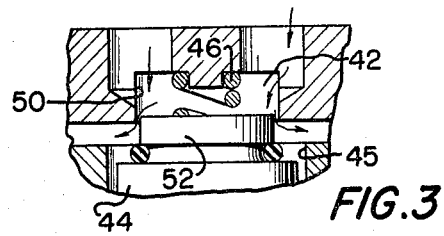
FIG. 3 is an enlarged fragment of FIG. 2 showing the motor shut-off valve.
Figure 2:
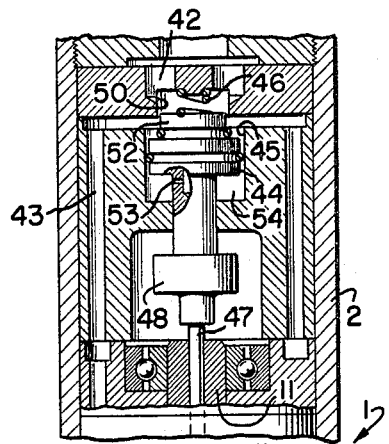
FIG. 2 is a fragmentary broken section showing the clutch partly released and the motor shut-off valve in a partly closed position.
Figure 2:
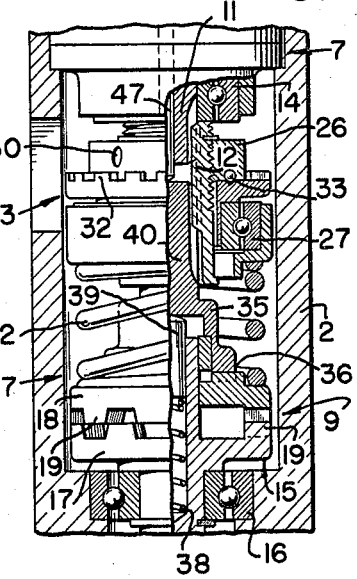
Figure 4:
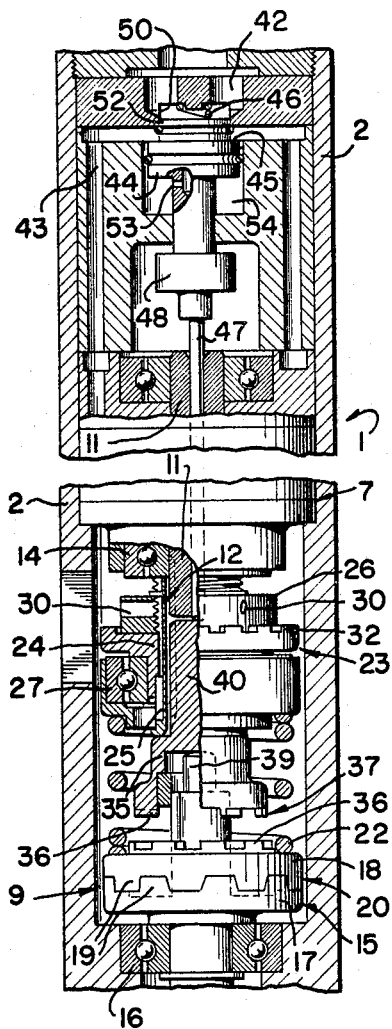
FIG. 4 is a fragmentary broken section showing the clutch fully released and the motor shut-off valve fully closed.

The pneumatic-powered angle wrench 1 shown in the drawing includes a casing 2 having a backhead 3 and a front nose 4. The backhead 3 carries a pivoted throttle lever 5 acting on a throttle valve stem 6. The depression of the throttle lever 5 feeds pneumatic pressure to a rotary motor 7 contained in the casing 2. The front nose 4 carries a rotary spindle 8 having a square cross section and adapted to be connected to a conventional wrench socket (not shown) for driving nuts and bolts. The motor 7 drives the spindle 8 through a clutch mechanism 9 and a planetary gear train 10. This invention rests in the clutch mechanism 9 and valve means for automatically shutting off the motor in response to the release of the clutch mechanism.

The motor 7 includes a splined rotor shaft 11 projecting forward from the motor and fitting in an internally splined sleeve 12 having splined engagement with the splines on the motor rotor shaft 11. The rotor shaft 11 is mounted in a bearing 14 which abuts the rear end of the sleeve 12.

An arbor 15 is rotatably mounted in a bearing 16 in the forward part of the casing 2 and includes a portion extending rearwardly of the bearing 16 toward the sleeve 12. The forward end of the arbor 15 drives the planetary gear train 10.

The arbor 15 includes an integral front clutch plate 17 resting against the rear face of the bearing 16. An intermediate clutch plate 18 is rotatably and slidably mounted on the arbor 15 behind the front clutch plate 17 and has cam teeth 19 with sloping sides adapted to engage corresponding cam teeth 19 formed on the front clutch plate 17. The cam teeth 19 on both clutch plates 17 and 18 are arranged to develop an axial separating force in response to a torque load. The two clutch plates 17 and 18 and their cam teeth 19 form a "cam clutch 20."

A large spring 22 is located behind the intermediate clutch plate 18 to engage and urge the intermediate clutch plate 18 against the front clutch plate 17. The force exerted on the intermediate clutch plate 18 by the spring 22 prevents the clutch plates 17 and 18 from separating below a predetermined maximum torque load and this predetermined clutch-releasing torque load can be varied by varying the tension on the spring 22.

The rear end of the spring 22 abuts an annular spring seat 23 which is slidably keyed on the sleeve 12. The spring seat 23 has an inwardly projecting radial tang 24 sliding in a longitudinal keyway 25 cut into the exterior of the sleeve 12. An adjustment nut 26 is threaded on the sleeve 12 for holding the spring seat 23 at desired locations on the sleeve 12. The spring seat 23 includes a bearing 27 supporting the rear end of the spring 22 for free rotation relative to the sleeve 12.

The nut 26 is turned on the sleeve 12 by the use of a geared chuck key 28, shown in FIG. 1. The chuck key 28 has an axial pin 29 at its front end adapted to fit a socket 30 formed in the circumference of the nut 26 and the gear teeth 31 of the key 28 engage corresponding teeth 32 on the rear face of the spring seat 23. Looking at FIG. 1, it should be readily seen that the rotation of the chuck key 28 causes the spring seat 23 and sleeve 12 to rotate relative to the nut 26, thus adjusting the nut 26 along the sleeve 12. The chuck key 28 is withdrawn from the tool during its operation. The nut 26 carries a detent ball 33 on its forward face adapted to seat in one of a series of depressions on the rear face of the spring seat 23 for preventing the nut 26 from inadevertently moving out of adjustment on the sleeve 12 during the operation of the tool.

A hollow clutch thimble 35 is slidably and rotatably mounted over the rear end of the arbor 15 and includes teeth 36 provided on its front end adapted to engage corresponding teeth 36 fixed on the rear face of the intermediate clutch plate 18. The clutch teeth 36 have longitudinally extending sides so that a torque carried by them does not create an axial separation force, as in the case of the "cam clutch 20." The clutch thimble 35 combines with the intermediate clutch plate 18 and the clutch teeth 36 to form a "secondary clutch 37" adapted to release after the separation of the "cam clutch 20."

The clutch thimble 35 is urged rearwardly by a light spring 38 and a follower 39 slidably mounted in a hollow pocket in the rear portion of the arbor 15. The clutch thimble 35 includes a splined rear end 40 slidably mounted in the internally splined sleeve 12 in splined engagement relationship so that the rotor shaft 11, the sleeve 12 and clutch thimble 35 are locked in non-rotatable relationship while being able to slide relative to each other. The sleeve 12 is short enough to allow the clutch thimble 35 to slide sufficiently rearward for the clutch 9 to be completely released.

The throttle valve 6 receives fluid pressure from an inlet passage 41 and, when open, feeds the pressure to a valve chamber 42. The valve chamber 42 opens at its mouth into a motor passage 43 leading to the motor 7. A slide valve 44 is slidably mounted in an axial bore 45 located in front of the valve chamber 42 and is movable between a rear position closing the mouth of the valve chamber 42 and a forward position opening the mouth of the valve chamber 42 to the motor passage 43.

A spring 46 urges the valve 44 forward to open the valve chamber 42. A linkage rod 47 extends between the valve 44 and the clutch thimble 35 through a hollow bore in the motor rotor shaft 11 with a rotatable bearing connection 48 provided between the rear end of the rod 47 and the valve 44. The spring 46 is stronger than the spring 38 in the arbor 15 so that the spring 46 normally urges the valve 44 to its open position and acts through the linkage rod 47 to urge the clutch thimble into engagement with the intermediate clutch plate 18.

The diameter of the axial bore 45 is substantially greater than the mouth 50 of the valve chamber 42 and the valve 44 includes a front portion 51 which has a substantially greater diameter than the rear portion 52 of the valve 44. The front portion 51 of the valve 44 carries a resilient O-ring acting as a piston ring and the rear portion 52 carries a resilient O-ring serving as a valve gasket adapted to seat on the mouth 50 of the valve chamber 42. The valve 44 contains a port 53 leading between its rear and front faces for feeding air pressure to the cavity or front end 54 of the axial bore 45.

When the valve 44 is open and fluid pressure is admitted to the valve chamber 42, the fluid pressure acts on both ends or faces of the valve in a manner to keep or hold the valve 44 in its forward position. However, when the "cam clutch 20" separates under a predetermined clutch-releasing torque load, it moves the clutch thimble 35 and linkage rod 47 rearwardly far enough to force the rear portion 52 of the valve 44 partly into the mouth 50 of the valve chamber 42. In this position of the valve 44, the area of the rear end of the valve 44 subject to fluid pressure is greatly reduced so that the total force created by the pressure in the front cavity 54 is sufficient to force the valve 44 completely into the mouth 50 of the valve chamber 42. In other words, once the rear portion 52 of the valve 44 enters the mouth 50 of the valve chamber 42, a differential pressure force acts on the valve 44 in a rearward direction with enough force to move the valve 44 entirely closed.

As the valve 44 is entirely closed by the differential fluid pressure force, the clutch thimble 35 is forced rearward by the spring 38 to the limit of its rearward movement while the intermediate clutch plate 18 returns forward to its engaged position with the front clutch plate 17. At this time, the clutch mechanism is fully released and the motor 7 is shut off.

When the operator releases the lever 5 to allow the throttle valve 6 to close, the fluid pressure in the valve chamber 42 is exhausted through the vent or bleed groove 56 formed in the stem of the throttle valve 6, as shown in FIG. 1. Exhausting the valve chamber 42 and the cavity 54 releases the rearward-acting fluid pressure force on the valve 44 and the valve spring 46 once again is effective to move the valve 44 to an open position and return the clutch thimble 35 to an engaged position with the intermediate clutch plate 18, thus engaging or closing the "secondary clutch 37."

Although this application describes a single embodiment, it should be recognized that the invention is not limited merely to this embodiment, but contemplates other embodiments and variations which utilize the concepts and teachings of the invention.

Having described our invention, we claim:

1. A fluid-powered wrench adapted to release its driving torque and shut off its motor in response to a predetermined torque load, said wrench comprising:
   (a) a body containing a fluid motor and a spindle for driving fasteners;
   (b) a clutch interconnected between said motor and spindle and adapted to release itself in response to a predetermined torque, said clutch including a member adapted to move axially rearward when said clutch releases;
   (c) a valve located in a passage feeding pressure fluid to said motor and adapted to close said passage to shut off said motor, said valve being mounted in the rear of said body and arranged to move rearwardly as it closes, said valve including first spring means engaging it and urging it to an open position;
   (d) linkage means interconnected between said valve and said axially movable clutch member adapted to force said valve rearwardly toward its closed position as said clutch opens;
   (e) said valve including means for utilizing fluid pressure to close it completely after it is partly closed by said linkage means during the release of said clutch; and
   (f) second spring means for normally urging said clutch member axially in a direction releasing said clutch, said second spring means acting in a direction opposite to and being weaker than said first spring means urging said valve to an open position, said second spring means being operative to force said clutch member rearwardly to its clutch releasing position after said valve is closed by fluid pressure.

2. The fluid-powered wrench of claim 1 wherein:
   (a) said valve includes two pressure surfaces acting in opposed directions, both of which are fed fluid pressure when the valve is fully open; and
   (b) one of said pressure surfaces is arranged to be exhausted when the valve is partly closed so that the fluid pressure on the other pressure surface moves the valve to a fully closed position.

3. The fluid-powered wrench of claim 2 wherein:
   (a) said valve includes a rear pressure surface and a forward pressure surface and is arranged so that a part of the rear pressure surface is exhausted when the valve is partly closed while the remainder of the rear pressure surface and forward pressure surface continue to be acted on by fluid pressure whereby the fluid pressure acting on the forward pressure surface is effective to close said valve.

References Cited by the Examiner

UNITED STATES PATENTS 2,683,512   7/1954   Boice _____ 192—56
3,187,860   6/1965   Simmons _____ 192—150

FOREIGN PATENTS 899,114   8/1960   Great Britain.

WAVID J. WILLIAMOWSKY, *Primary Examiner.*

BENJAMIN W. WYCHE III, *Examiner.*